Aug. 19, 1958 J. R. RANDOLPH ET AL 2,848,538
MAGNASONIC HEARING AID DEVICE
Filed May 21, 1952
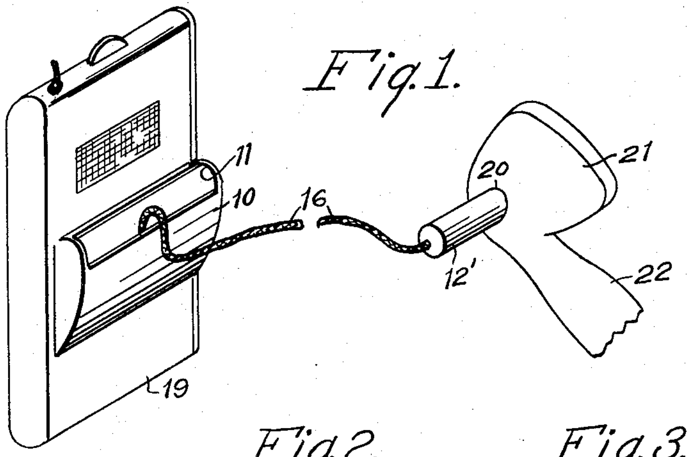
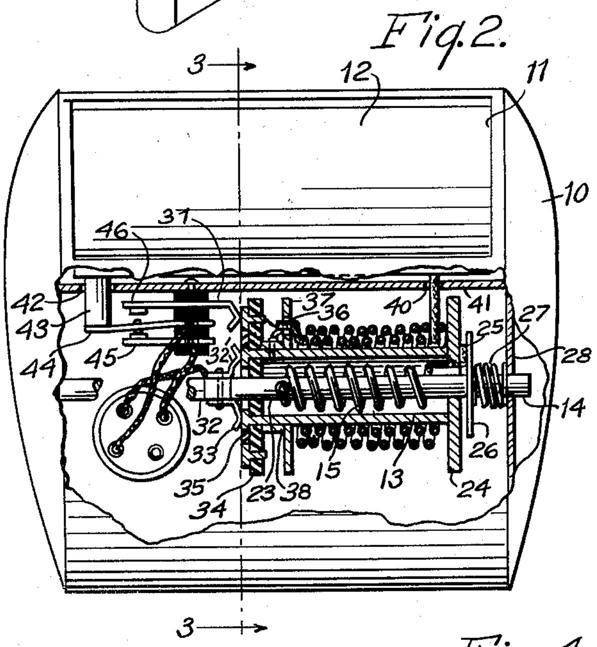
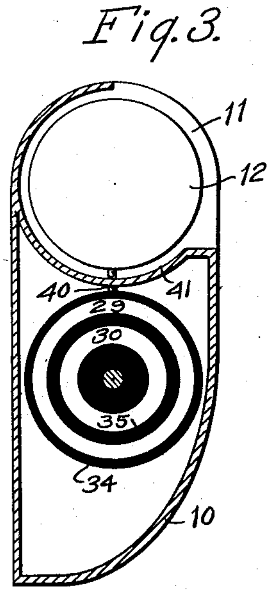
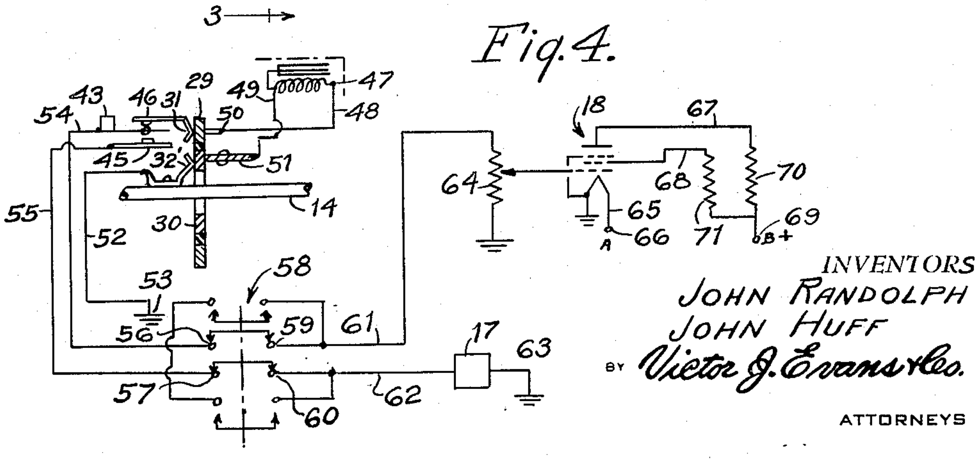
INVENTORS
JOHN RANDOLPH
JOHN HUFF
BY Victor J. Evans & Co.
ATTORNEYS 2,848,538
Patented Aug. 19, 1958

2,848,538

MAGNASONIC HEARING AID DEVICE

John R. Randolph and John L. Huff, Worland, Wyo.

Application May 21, 1952, Serial No. 289,044

2 Claims. (Cl. 179—1)

This invention relates to hearing aid devices, and in particular an attachment for a hearing aid whereby with the attachment of the hearing aid positioned in close proximity to a telephone receiver a deaf person may use the telephone with greater expediency.

The purpose of this invention is to provide means for combining a hearing aid with a receiver of a telephone whereby an inductance coil of the hearing aid picks up only the electro magnetic field of the telephone eliminating outside noise and other interfering sounds.

In the conventional manner of using a hearing aid with a telephone the telephone receiver is held against the body of the hearing aid and with the receiver held in this position outside sounds as well as noise transmitted through the telephone receiver are picked up and interfere with the voice signals. By this means the voice signals are weakened and distorted by the ensuing air gap between the receiver and the hearing aid. With this thought in mind this invention contemplates a method of transferring sound signals of a telephone receiver to a hearing aid by inductance whereby the voice signals only are received.

The object of this invention is, therefore, to provide an attachment for a hearing aid whereby voice signals of the hand piece of telephone are transmitted to the ear phone of the hearing aid via inductance.

Another object of the invention is to provide an attachment for a hearing aid whereby sound signals are transmitted to the hearing aid from the receiver of a telephone instrument through a magnetic induction coil whereby the hearing aid may be switched from the conventional microphone therein to the magnetic induction coil by removing the coil from an attachment positioned on the hearing aid.

A further object of the invention is to provide means for using a hearing aid in combination with a telephone without interfering with conventional use of the telephone.

A still further object of the invention is to provide an attachment, adapted to be used on a hearing aid through which sound signals of the telephone are transmitted to the receiver of a hearing aid instrument by inductance in which the attachment is of a simple and economical construction.

With these and other objects and advantages in view the invention embodies a casing adapted to be secured to a hearing aid and high impedance open field induction coil with an electro-static shield connected to the attachment with a cord on a spring actuated spool and adapted to be selectively positioned in a pocket in the casing or positioned in close proximity to a telephone receiver.

Other features and advantages of the invention will appear from the following description taken in connection with the drawing, wherein:

Figure 1 is a perspective view illustrating the attachment of this invention with the casing positioned on the face of a hearing aid and with the high impedance induction coil positioned adjacent the ear phone of a telephone instrument.

Figure 2 is a side elevational view of the casing forming the attachment of this invention with part of the outer wall of the casing broken away illustrating the spring actuated spool and automatic switching device, and showing the parts on an enlarged scale.

Figure 3 is a cross section through the casing of the attachment taken on line 3—3 of Fig. 2.

Figure 4 is a wiring diagram showing the high impedance field induction coil of the attachment connected through contact rings on the cord winding spool and also through a jack to the microphone and tube of the first stage of the amplifier of the hearing aid.

Referring now to the drawing wherein like reference characters denote corresponding parts the hearing aid telephone attachment of this invention includes a casing 10 having a pocket 11 in the upper end, pick up 12 in which the high impedance field induction coil is positioned, a spool 13 journaled on a shaft 14 in the casing 10, a spring 15 for winding the spool, and a cord 16 connecting the coil of the pickup 12 to the microphone 17 and tube 18 of the first stage of the amplifier of the hearing aid.

With the parts as illustrated in the drawing the attachment casing 10 is positioned on the face of a hearing aid 19 and the pickup 12 is positioned adjacent the point 20 of the receiver end 21 of a hand piece 22 of a telephone instrument.

The spool 13 is journaled on the shaft 14 and the shaft is stationary in the casing. The spring 15 is attached to the shaft 14 at the point 23 and the opposite end of the spring is attached to the flange 24 of the spool 13 at the point 25. A disc 26 is urged by a spring 27, positioned between the disc and a partition 28 toward the opposite end of the casing whereby contact rings 29 and 30 are urged against brushes 31, 32 and 33.

The cord 16 is provided with two wires one of which is connected to the contact ring 29 and the other to the inner contact ring 30, as shown in Fig. 2.

The rings 29 and 30 are mounted on a disc or flange 34 with an insulating ring 35 between the rings 29 and 30 and the end of the cord 16 is held in an opening 36 in a disc 37 that is secured to the disc 34 with a sleeve 38.

The cord 16 extends through an opening 40 in a wall 41 forming the lower side of the pocket 11 and the wall 41 is also provided with an opening 42 through which a button 43 extends, the button 43 being positioned to be engaged by the pickup 12 as the pickup is placed in the pocket 11 whereby a circuit is broken to the outside magnetic induction coil in the pickup 12 and returned to the conventional microphone of the hearing aid.

The button 43 is positioned on a contact arm 44 that is positioned to engage a contact 45 with the pick up 12 in the pocket 11, and that is snapped upwardly by spring inherent therein to engage a contact 46 when the pick up 12 is removed from the pocket 11, of the attachment.

The high impedance field induction coil of the pick up 12, as indicated by the numeral 47 is connected by wires 48 and 49 to the rings 29 and 30, respectively by contacts 50 and 51 and the contacts 32 and 33 are connected by a wire 52 to a ground, as indicated by the numeral 53.

The contact arms 44 and 45 are connected by wires 54 and 55, respectively to contacts 56 and 57 of a jack, generally indicated by the numeral 58 and corresponding terminals 59 and 60 of the jack are connected by wires 61 and 62 to the tube of the first stage of the amplifier of the hearing aid as indicated by the numeral 18 and to the microphone of the hearing aid as indicated by the numeral 17, respectively. The opposite terminal of the microphone is connected by a wire 63 to a ground and the wire 61 is connected to a volume control 64. The filament of the tube 18 is connected by a wire 65 to a battery terminal 66 and the plate and grid are connected by wires 67 and 68, respectively to a battery terminal 69 through resistance coils 70 and 71.

The principle used in the induction coil that is used in the ear phone or receiver is that telephone receivers have present, while in use, a magentic field changing to correspond to the changing electrical current caused by speaking into the transmitter of the telephone that is being used by the other party. These changing magnetic lines of force cut the turns of wire in the induction pick up and the induced voltage caused by that field, is applied to the amplifier of the hearing aid, and in that way a more distinct transfer of the spoken word is brought about than picking up the sound from the earpiece of the telephone by use of the conventional microphone of the hearing aid.

The advantages of the above device are readily apparent in that when switched to the telephone circuit, the hearing aid is inoperative in so far as outside noises are concerned and picks up only the electromagnetic field of the telephone; thereby, the voice of the person on the other phone is reproduced to the user of the device of this invention in a normal, natural tone not being distorted or changed, as where the telephone receiver is held against the body of the hearing aid, gathering outside sounds as well as the sounds transmitted through the phone receiver. The sounds of the hearing aid are necessarily weakened and distorted by the ensuing air gap and rubbing contact with the receiver on the hearing aid itself. It is further readily apparent that an entirely normal procedure of phone conversation is accomplished in that the user of the device of this invention holds the induction coil, which is extended to normal arm length, to the receiver of the telephone, or to the loud speaker in case of sound moving pictures, such as the drive-in stations where theaters are so equipped, or to inter-office communication hook-ups. In addition thereby the receiver at the same time is held against the ear or cheek of the person using the device which permits an entirely private conversation to the user in that the sounds conducted to the user are restricted to him or her alone and are not released to the general vicinity, as is the case where the receiver is held against the hearing aid proper, and it is immaterial whether the reception is air conducted or picked up by separate coil contained solely in the body of the hearing aid itself. The attachment can be made with hearing aids at the time of manufacture or can easily be applied to conventional hearing aids already in use.

It will be understood that modifications may be made in the design and arrangement of the parts without departing from the spirit of the invention.

What is claimed is:

1. In a telephone attachment, the combination which comprises a casing having an open pocket in the upper part, a spool journaled in the casing, a spring positioned in the casing for winding the spool, contact rings on the spool, brushes positioned to engage the contact rings of the spool, a pickup coil having a high impedance field induction coil therein freely positioned in the pocket of the casing, a switch positioned in the casing and having a button extended itno the open pocket in the upper part thereof, said button positioned to be engaged by the coil for closing a circuit to the coil positioned in the pocket, an electric cord extended around the spool and connected at one end to the contact rings on the spool and at the other to the coil, and said coil is adapted to be positioned adjacent a telephone receiver having an ear piece.

2. In a telephone attachment, the combination which comprises a casing having an open pocket in the upper part, a spool journaled in the casing, a spring positioned in the casing for winding the spool, contact rings on the spool, brushes positioned to engage the contact rings of the spool, one of said brushes having a contact thereon, a pickup having a high impedance field induction coil therein freely positioned in the pocket of the casing, a switch positioned in the casing and having engagement with the contact on said one brush, said switch having a button extended into the open pocket in the upper part thereof, said button positioned to be engaged by the pickup for disengaging the switch from the contact on the brush to break the circuit to the pickup when the pickup is positioned in the pocket, and an electric cord extended around the spool and connected at one end to the contact rings on the spool and at the other to the coil of the pickup.

References Cited in the file of this patent

UNITED STATES PATENTS

| | | |
|---|---|---|
| 1,116,402 | Ferguson | Nov. 10, 1914 |
| 2,005,973 | Hellman | June 25, 1935 |
| 2,268,665 | Loewe | Jan. 6, 1942 |
| 2,381,097 | Adams | Aug. 7, 1945 |
| 2,384,604 | Dann | Sept. 11, 1945 |
| 2,530,621 | Lybarger | Nov. 21, 1950 |
| 2,554,834 | Lavery | May 29, 1951 |

FOREIGN PATENTS

| | | |
|---|---|---|
| 592,990 | Great Britain | Oct. 6, 1947 |